US012061710B2

(12) United States Patent
Venkatasubramanian

(10) Patent No.: US 12,061,710 B2
(45) Date of Patent: Aug. 13, 2024

(54) MECHANISM FOR SECURE LIBRARY SHARING

(71) Applicant: Intel Corporation, Santa Clara, CA (US)

(72) Inventor: Sankaranarayanan Venkatasubramanian, Tirunelveli (IN)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 17/545,163

(22) Filed: Dec. 8, 2021

(65) Prior Publication Data

US 2022/0092196 A1    Mar. 24, 2022

(51) Int. Cl.
  *G06F 21/00* (2013.01)
  *G06F 21/60* (2013.01)
  *H04L 9/32* (2006.01)

(52) U.S. Cl.
  CPC .......... G06F 21/604 (2013.01); H04L 9/3236 (2013.01); *G06F 2221/2149* (2013.01)

(58) Field of Classification Search
  CPC .... G06F 21/53; G06F 21/604; G06F 21/6281; G06F 2221/2149; H04L 9/3236; H04L 9/3239
  See application file for complete search history.

(56) References Cited

U.S. PATENT DOCUMENTS

| | | | | |
|---|---|---|---|---|
| 2019/0005229 A1* | 1/2019 | Hlaing | | G06F 9/445 |
| 2022/0108001 A1* | 4/2022 | Nye | | G06F 21/44 |
| 2022/0277108 A1* | 9/2022 | Peng | | G06F 21/57 |

FOREIGN PATENT DOCUMENTS

| | | | | |
|---|---|---|---|---|
| CN | 107408068 A | * | 11/2017 | ............ G06F 11/073 |
| CN | 111400723 A | * | 7/2020 | |
| CN | 114117412 A | * | 3/2022 | |

OTHER PUBLICATIONS

NPL 2022—VM with TEE (Year: 2022).*

* cited by examiner

*Primary Examiner* — Tri M Tran
(74) *Attorney, Agent, or Firm* — Jaffery Watson Mendonsa & Hamilton LLP

(57) ABSTRACT

An apparatus comprising a memory comprising a protected memory region and a processor comprising a trusted execution environment (TEE) to load a library in a shared library region within the protected memory region and execute a plurality of applications to share access to the library in the shared library region.

20 Claims, 7 Drawing Sheets

| Shared Lib | Processes | Mapped pages | Measurement |
|---|---|---|---|
| lib1 | App1, App2, AppN | App1...<br>App2...<br>App3... | dss883jhds |
| lib2 | App1, AppN | App1...<br>AppN2... | x5dsfs8983 |
| libN | App1, App2 | App1...<br>App2... | 2b62hhoius |

MECHANISM FOR SECURE LIBRARY SHARING

BACKGROUND OF THE DESCRIPTION

Trusted execution environments (TEEs) are secure areas that are isolated from computer platform components (e.g., software and hardware). In order to be executed in a TEE, an application will typically need to be partitioned/recompiled to run in such an environment. However, with technologies such as library operating systems (LibOSs), unmodified binary files may be executed in TEEs without the need to recompile because the library OSs allow the entire process to be securely executed in a TEE by accessing an untrusted (or outside region) only to perform operations that cannot be performed within the TEE. Thus, the library OS executes as a protected memory region that provides confidentiality for data and code execution (or enclave) within the TEE.

While this is a good approach for executing unmodified binary files within a TEE, current implementations have drawbacks when it comes to executing the executable and binary files that depend on shared libraries. This is because the shared libraries that applications depend on are loaded in the protected/TEE memory region for each process, ultimately breaking what shared libraries are meant for.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for disclosure may admit other equally effective embodiments.

FIG. 5 illustrates one embodiment of a metadata table.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is disclosed to securely share libraries within a TEE when multiple applications/processes depend on the same libraries. In such an embodiment, a shared library memory region is provided within a TEE protected memory region for loading shared libraries. As defined herein, a library is a collection of programs and software packages (e.g., configuration data, documentation, help data, message templates, pre-written code and subroutines, classes, values or type specifications) loaded and stored for immediate use, while a shared library is a file that is intended to be shared by multiple programs.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
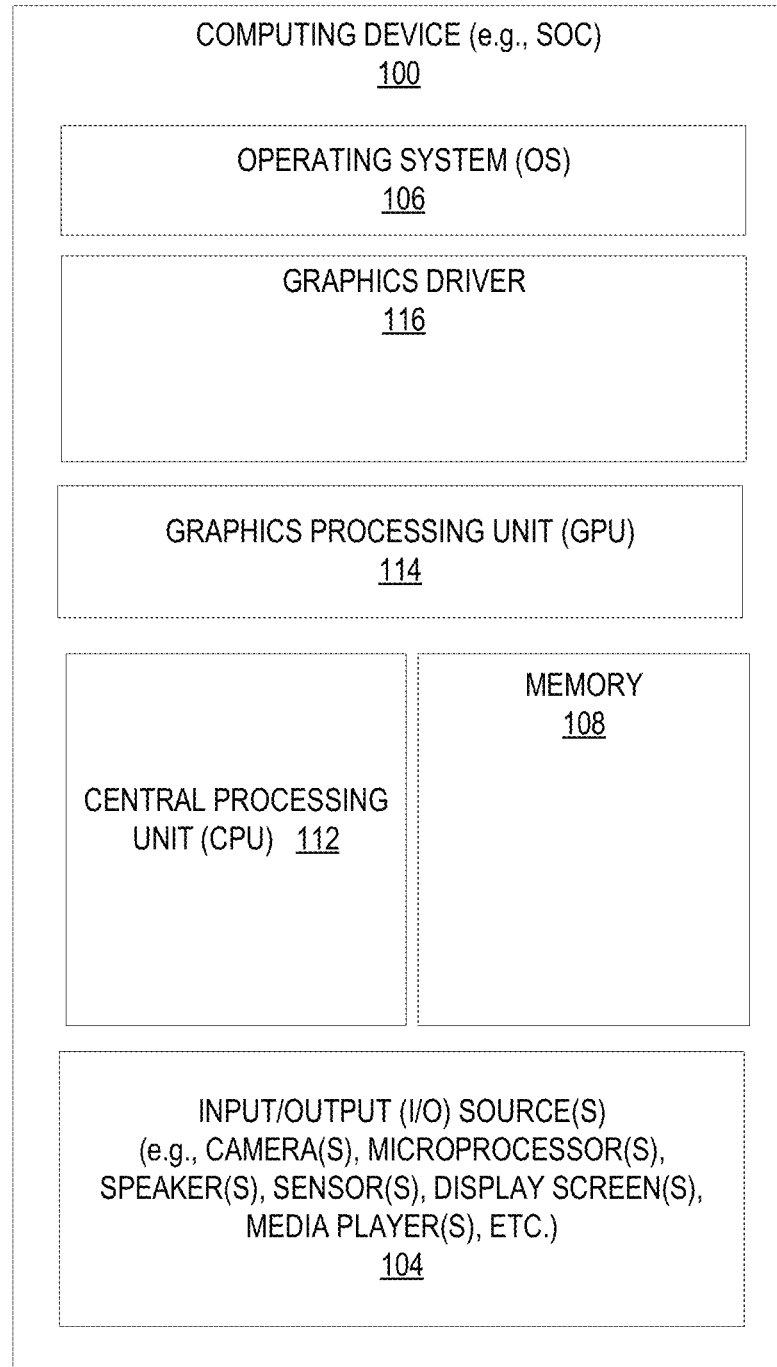
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

The term "logic" may include, by way of example, software or hardware and/or combinations of software and hardware.

Figure 2:
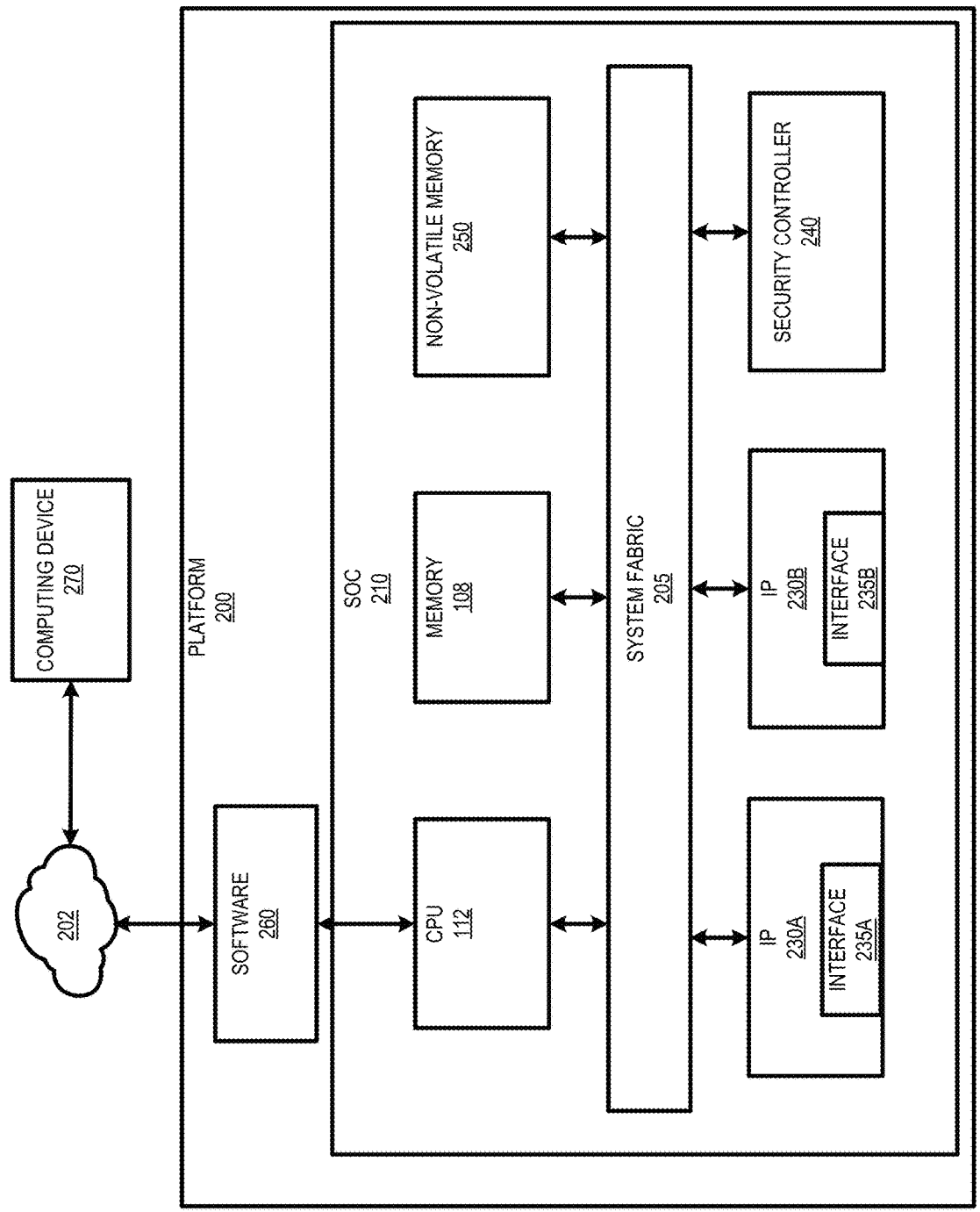
FIG. 2 illustrates one embodiment of a platform.

FIG. 2 illustrates one embodiment of a platform 200 including a SOC 210 similar to computing device 100 discussed above. As shown in FIG. 2, platform 200 includes SOC 210 communicatively coupled to one or more software components 260 via CPU 112. In a further embodiment, platform 200 may also be coupled to a computing device 270 via a cloud network 202. In this embodiment, computing device 270 comprises a cloud agent that is provided access to SOC 210 via software 260.

Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., 235A and 235B) to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises a cryptographic processor IP agent 230 implemented to perform the security operations. Further, SOC 210 includes a non-volatile memory 250. Non-volatile memory 250 may be implemented as a Peripheral Component Interconnect Express (PCIe) storage drive, such as a solid-state drive (SSD) or Non-Volatile Memory Express (NVMe) drives.

According to one embodiment, platform 200 may be implemented as a trusted execution environment (TEE). A TEE is a secure area of platform 200 (e.g., CPU 112) that guarantees code and data loaded within platform 200 are protected with respect to confidentiality and integrity. Additionally, TEE is an isolated execution environment that provides security features such as isolated execution and integrity of applications executing with the TEE, along with confidentiality of their assets. Thus, the TEE offers an execution space that provides a higher level of security for trusted applications operating on platform 200.

Figure 3:
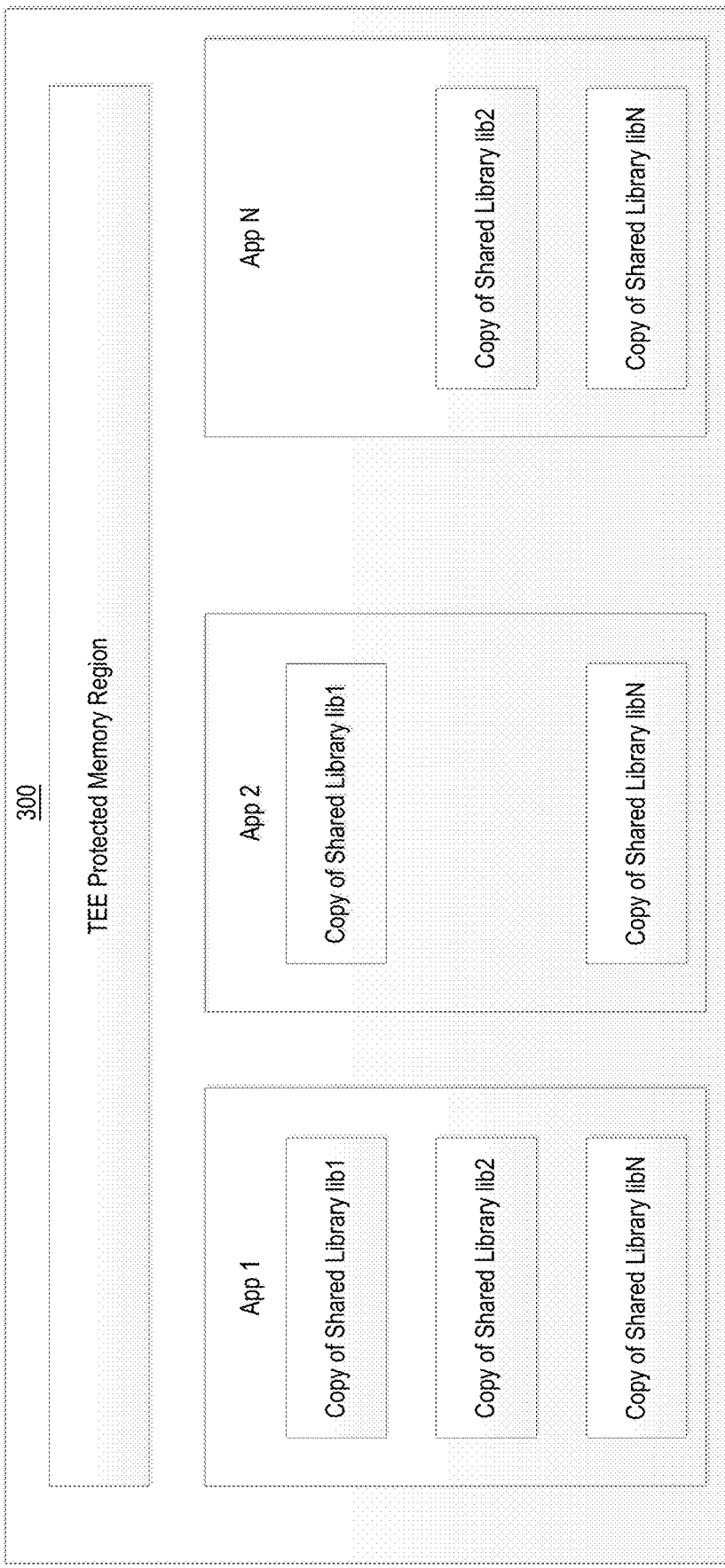
FIG. 3 illustrates a conventional TEE protected memory region.

As discussed above, libraries shared by multiple applications are loaded in a TEE memory region for each application, which contradicts the concept of shared libraries. For example, FIG. 3 illustrates a conventional TEE protected memory region 300 having multiple applications (e.g., App 1-App N). As shown in FIG. 3, a separate copy of a shared library is loaded (e.g., via a LibOS process in TEE protected memory region) for each application. For example, a separate copy of shared library lib1 is loaded for App 1 and App 2. Similarly, a separate copy of shared library lib2 is loaded for App 1 and App N. This separate loading of shared libraries creates redundancies, as well as additional inefficiencies in accessing the same code and utilizing memory space.

According to one embodiment, a mechanism is disclosed to securely share libraries within a TEE when multiple processes (or applications) depend on the same libraries. In such an embodiment, a shared library memory region is provided within a TEE protected memory region for loading shared libraries. In a further embodiment, the shared library memory region comprises a metadata table that indicates libraries that are being shared and applications that are accessing each library.

In yet a further embodiment, a hash measurement is performed on library executable code to generate a shared library measurement when a library is first loaded into shared library memory region. In a further embodiment, the shared library measurement is included in the metadata table. In addition, the metadata table is used to maintain reference counting. Reference counting occurs each time a library OS process begins executing in the TEE and after a hash measurements and security checks determine that the same shared libraries from the shared library memory region are to be used. As a result, the metadata table is updated by incrementing the reference count for those shared libraries. Similarly, the reference counts for corresponding shared libraries in the shared library memory region is decremented whenever a library OS process that is using the shared libraries from the shared library memory region exits. When the reference count of any shared libraries is zero, the shared library is cleared from the shared library memory region According to one embodiment, data that a shared library needs to operate is included in the protected memory region specific to the process that is accessing it. In this embodiment, code within an application that implements the shared library is redirected at runtime to the protected memory region after accessing the metadata to determine the applications that are permitted to access the library. Upon future accesses of the shared library by other applications, a hash measurement for the library stored in a manifest (or loader file) associated with the application is compared against the shared library measurement stored in the metadata table. The metadata table is updated with details associated with the application that is to access to this library upon a determination that the measurement match. Further, the reference counting is also updated. The security checks are performed to ensure that the protected memory region is accessible only when the applications is to access the shared library based on the metadata table.

Figure 4:
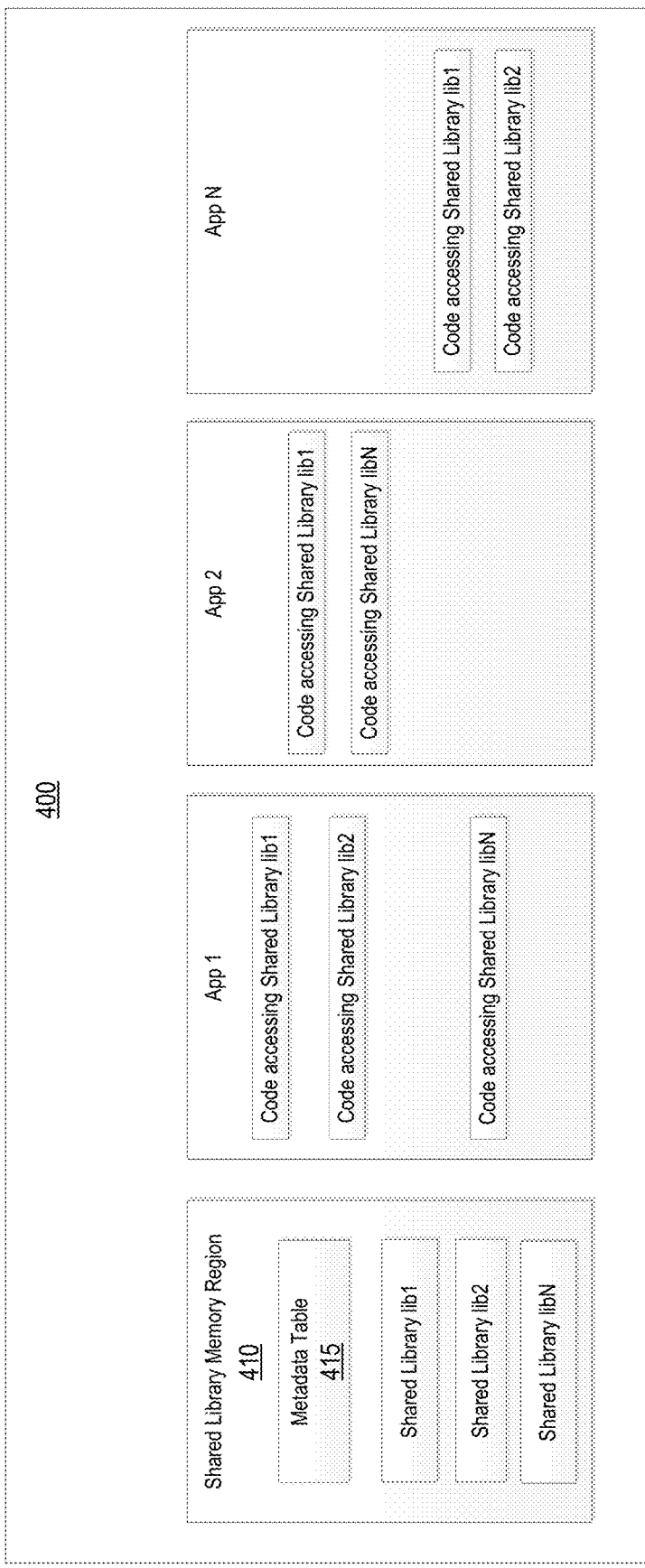
FIG. 4 illustrates one embodiment of a TEE protected memory region.

FIG. 4 illustrates one embodiment of a TEE protected memory region 400. As shown in FIG. 4, TEE protected memory region 400 includes a shared library memory region 410. In one embodiment, protected memory region 400 is established at platform boot during the setup of TEE protected memory region 400. Shared library memory region 410 includes the code components associated with shared libraries lib1-libN and a metadata table 415 to store metadata related to lib1-libN. In one embodiment, the data component of the dependency is specific to a memory region that a private memory region (e.g., secure container (or enclave)) is designated to use from the protected memory. In a further embodiment, shared library memory region 410 may be configured and expanded as required at runtime (e.g., via system software).

At the enclave build time, a dependent library is tagged as a shared/dynamic dependency. As mentioned above, the library code is also measured by performing a hash on the relevant code sections to generate the shared library measurement. When a first application (or process) is to access a library, the dynamic dependency loads the code into protected memory region 400 at the time of initializing an enclave, and will load the dynamic dependencies after verifying the digest into shared library memory region 410. Metadata table 415 includes the information regarding the shared libraries loaded, their shared library measurement, and the process(es) that are using the library. Metadata table 415 also includes the information of the data area for the shared libraries pointing to the area of the process that is using it. In one embodiment, this data is very specific to the process that is using the shared object and will not be available for the other processes. FIG. 5 illustrates one embodiment of metadata table 415.

When a subsequent process is to access a measurement that is stored in a loader file (or manifest) associated with the library is compared against the measurement stored in metadata table 415. Upon a determination that the measurement matches, the metadata table is updated with details associated with the subsequent process that is to access the library. The reference counting is also updated. The necessary security checks are performed to make sure only this region is accessible when the processes need access to this shared library based on the metadata table.

Figure 6:
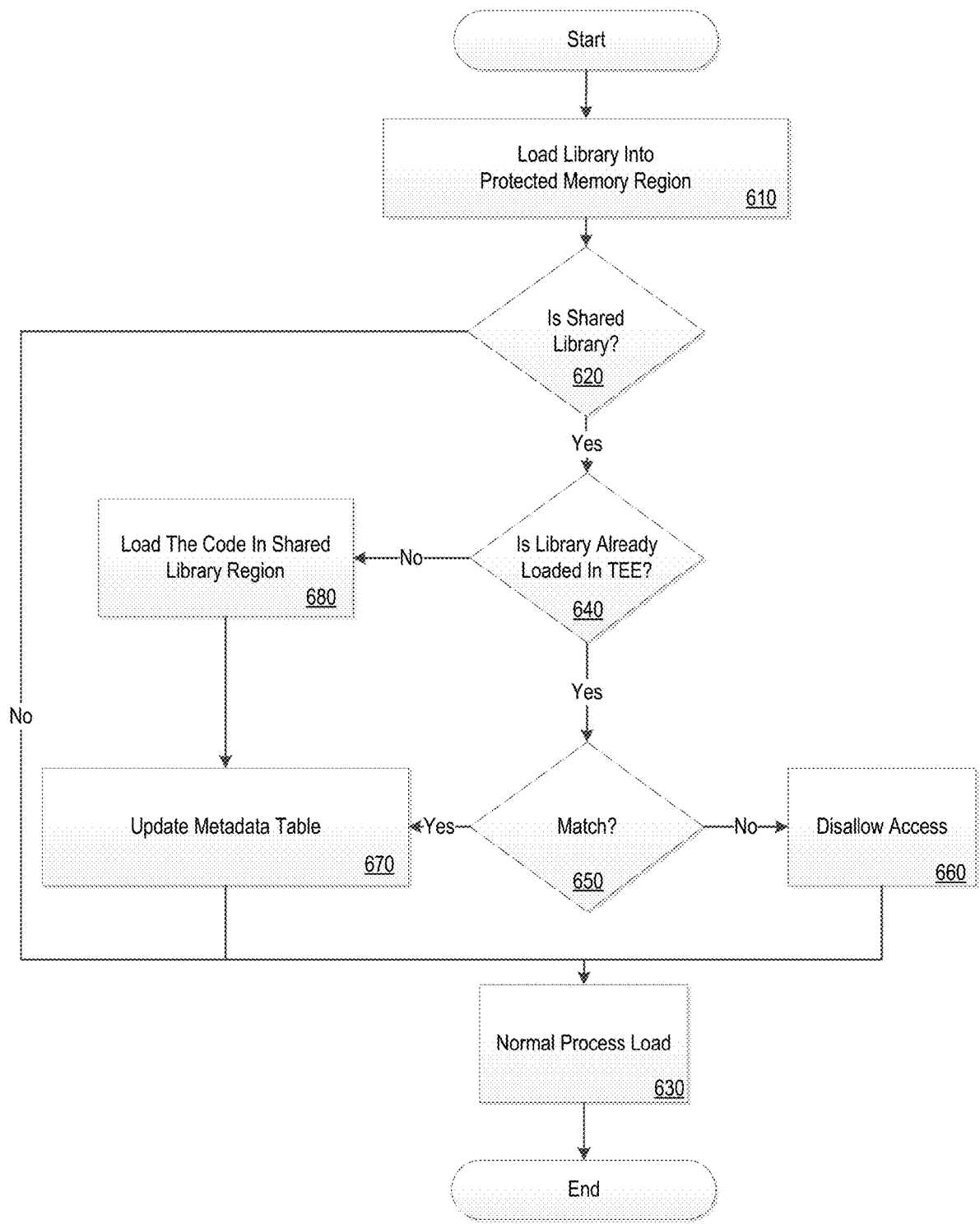
FIG. 6 is a flow diagram illustrating one embodiment of a process for loading a shared library.

FIG. 6 is a flow diagram illustrating one embodiment of a process for loading a shared library. At processing block 610, a library is loaded into the protected memory region. At decision block 620, a determination is made as to whether the library is shared. If not, the normal loading process is completed, processing block 630. In one embodiment, the normal loading process involves treating the library as a shared library and loading a copy of it in the shared library memory region, or loading the code in the protected memory region itself when it is not built as a shared library.

Upon a determination at decision block 620 that the library is shared, a determination is made as to whether the library is already loaded in the TEE, decision block 640. If so, the library code measurement is compared to the measurement stored in the metadata table. Accordingly, at decision block 650 a determination made as to whether the library code measurement matches the measurement stored in the metadata table. If not, the application is disallowed access to the shared library, processing block 660. When there is no match in the shared memory region, it is treated as a new library that is to be loaded. Thus, control is returned to the processing block 630, where the normal loading process is performed.

Upon a determination at decision block 650 that the library code measurement matches the measurement stored in the metadata table, the metadata table is updated (e.g., base data structures for access permissions, hash, process details and address references), processing block 670. Subsequently, control is returned to processing block 630 where the normal loading process is completed. Upon a determination at decision block 640 that the library is not loaded in the TEE, the library code is loaded into the shared library memory region, processing block 680. Subsequently, control is returned to processing block 670 where the metadata table is updated, and processing block 630 where the normal loading process is completed.

Figure 7:
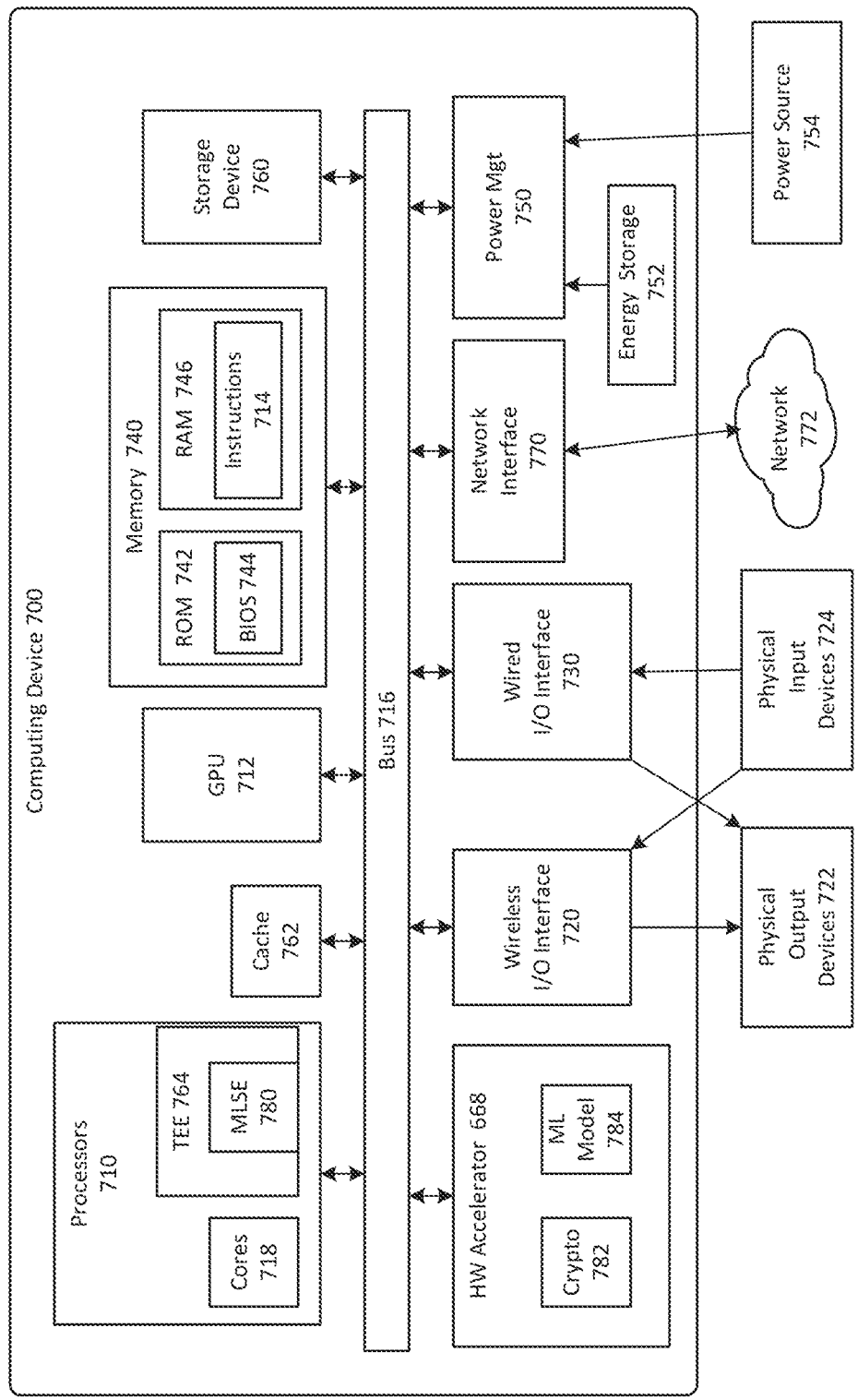
FIG. 7 is a schematic diagram of an illustrative electronic computing device.

FIG. 7 illustrates one embodiment of a schematic diagram of an illustrative electronic computing device. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art.

The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising a memory comprising a protected memory region and a processor comprising a trusted execution environment (TEE) to load a library in a shared library region within the protected memory region and execute a plurality of applications to share access to the library in the shared library region Example 2 includes the subject matter of Example 1, wherein the shared library region comprises a metadata table indicating the library being shared and one or more of the plurality of applications that are accessing the library.

Example 3 includes the subject matter of Examples 1 and 2, wherein the TEE generates a shared library measurement prior to loading the library in the shared library region.

Example 4 includes the subject matter of Examples 1-3, wherein the TEE stores the shared library measurement in the metadata table.

Example 5 includes the subject matter of Examples 1-4, wherein the TEE executes code associated with a first of the plurality of applications and accesses the metadata table to determine whether the first application is permitted to access the library.

Example 6 includes the subject matter of Examples 1-5, wherein the TEE compares a hash measurement associated with the library included in the first application to the shared library measurement.

Example 7 includes the subject matter of Examples 1-6, wherein the TEE redirects the first application to the library within the shared library region upon determining that the hash measurement matches the shared library measurement.

Example 8 includes the subject matter of Examples 1-7, wherein the TEE updates the metadata table with details associated with the first application upon determining that the hash measurement matches the shared library measurement.

Example 9 includes the subject matter of Examples 1-8, wherein the TEE executes code associated with a second of the plurality of applications and accesses the metadata table to determine whether the second application is permitted to access the library.

Some embodiments pertain to Example 10 that includes an method comprising loading a library in a shared library region within a protected memory region of a trusted execution environment (TEE) and executing a plurality of applications to share access to the library in the shared library region.

Example 11 includes the subject matter of Example 10, wherein the shared library region comprises a metadata table indicating the library being shared and one or more of the plurality of applications that are accessing the library.

Example 12 includes the subject matter of Examples 10 and 11, further comprising generating a shared library measurement prior to loading the library in the shared library region and storing the shared library measurement in the metadata table.

Example 13 includes the subject matter of Examples 10-12, further comprising executing code associated with a first of the plurality of applications and accessing the metadata table to determine whether the first application is permitted to access the library.

Example 14 includes the subject matter of Examples 10-13, further comprising comparing a hash measurement associated with the library included in the first application to the shared library measurement and updating the metadata table with details associated with the first application upon determining that the hash measurement matches the shared library measurement.

Example 15 includes the subject matter of Examples 10-14, further comprising redirecting the first application to the library within the shared library region upon determining that the hash measurement matches the shared library measurement.

Some embodiments pertain to Example 16 that includes at least one computer readable medium having instructions stored thereon, which when executed by one or more processors, cause the processors to load a library in a shared library region within a protected memory region of a trusted execution environment (TEE) and execute a plurality of applications to share access to the library in the shared library region.

Example 17 includes the subject matter of Example 16, wherein the shared library region comprises a metadata table indicating the library being shared and one or more of the plurality of applications that are accessing the library.

Example 18 includes the subject matter of Examples 16 and 17, having instructions stored thereon, which when executed by one or more processors, further cause the processors to generate a shared library measurement prior to loading the library in the shared library region and store the shared library measurement in the metadata table.

Example 19 includes the subject matter of Examples 16-18, having instructions stored thereon, which when executed by one or more processors, further cause the processors to execute code associated with a first of the plurality of applications and access the metadata table to determine whether the first application is permitted to access the library.

Example 20 includes the subject matter of Examples 16-19, having instructions stored thereon, which when executed by one or more processors, further cause the processors to compare a hash measurement associated with the library included in the first application to the shared library measurement and update the metadata table with details associated with the first application upon determining that the hash measurement matches the shared library measurement.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
a processor comprising a trusted execution environment (TEE) to execute instructions to load data associated with a software library in a shared library region within a protected memory region,
execute a first application within the TEE to access one or more components associated with the software library in the shared library region and
execute a second application within the TEE to access the one or more components associated with the software library in the shared library region, wherein the one or more components associated with the software library are encrypted within the protected memory region of the TEE.

2. The apparatus of claim 1, the shared library region comprises a metadata table indicating the software library being shared and one or more of a plurality of applications that are accessing the software_library.

3. The apparatus of claim 2, wherein the TEE generates a shared library measurement prior to loading the software library in the shared library region.

4. The apparatus of claim 3, wherein the TEE stores the shared library measurement in the metadata table.

5. The apparatus of claim 4, wherein the TEE accesses the metadata table to determine whether the first application is permitted to access the software library.

6. The apparatus of claim 5, wherein the TEE compares a hash measurement associated with the software library included in the first application to the shared library measurement.

7. The apparatus of claim 6, wherein the TEE redirects the first application to the library within the shared library region upon determining that the hash measurement matches the shared library measurement.

8. The apparatus of claim 7, wherein the TEE updates the metadata table with details associated with the first application upon determining that the hash measurement matches the shared library measurement.

9. The apparatus of claim 8, wherein the TEE executes code associated with a third application to access the one or more components associated with a second software library in the shared library region.

10. A method comprising:
loading data associated with a software library in a shared library region within a protected memory region of a trusted execution environment (TEE), wherein one or more components associated with the software library are encrypted within the protected memory region of the TEE;
executing a first application within the TEE to access one or more components associated with the software library in the shared library region; and
executing a second application within the TEE to access the one or more components associated with the software library in the shared library region.

11. The method of claim 10, wherein the shared library region comprises a metadata table indicating the software library being shared and one or more of a plurality of applications that are accessing the library.

12. The method of claim 11, further comprising:
generating a shared library measurement prior to loading the software library in the shared library region; and
storing the shared library measurement in the metadata table.

13. The method of claim 12, further comprising:
executing code associated with a first of the plurality of applications; and
accessing the metadata table to determine whether the first application is permitted to access the software library.

14. The method of claim 13, further comprising:
comparing a hash measurement associated with the software library included in the first application to the shared library measurement; and
updating the metadata table with details associated with the first application upon determining that the hash measurement matches the shared library measurement.

15. The method of claim 14, further comprising redirecting the first application to the software library within the shared library region upon determining that the hash measurement matches the shared library measurement.

16. At least one non-transitory computer readable medium having instructions stored thereon, which when executed by one or more processors, cause the processors to:
load data associated with a software library in a shared library region within a protected memory region of a trusted execution environment (TEE), wherein one or more components associated with the software library are encrypted within the protected memory region of the TEE;
execute a first application within the TEE to share access one or more components associated with the software library in the shared library region; and
execute a second application within the TEE to access the one or more components associated with the software library in the shared library region.

17. The computer readable medium of claim 16, wherein the shared library region comprises a metadata table indicating the library being shared and one or more of a plurality of applications that are accessing the software library.

18. The computer readable medium of claim 17, having instructions stored thereon, which when executed by one or more processors, further cause the processors to:
generate a shared library measurement prior to loading the library in the shared library region; and
store the shared library measurement in the metadata table.

19. The computer readable medium of claim 18, having instructions stored thereon, which when executed by one or more processors, further cause the processors to:
execute code associated with a first of the plurality of applications; and
access the metadata table to determine whether the first application is permitted to access the library.

20. The computer readable medium of claim 19, having instructions stored thereon, which when executed by one or more processors, further cause the processors to:
compare a hash measurement associated with the software library included in the first application to the shared library measurement; and
update the metadata table with details associated with the first application upon determining that the hash measurement matches the shared library measurement.

* * * * *